US011533078B2

(12) United States Patent
Chechik et al.

(10) Patent No.: US 11,533,078 B2
(45) Date of Patent: Dec. 20, 2022

(54) SIGNAL CROSSTALK SUPPRESSION ON A COMMON WIRE

(71) Applicant: ELBIT SYSTEMS LAND AND C4I LTD., Netanya (IL)

(72) Inventors: Yeheskel Chechik, Netanya (IL); Jacob Vintor, Netanya (IL)

(73) Assignee: ELBIT SYSTEMS LAND AND C4I LTD., Netanya (IL)

( * ) Notice: Subject to any disclaimer, the term of this patent is extended or adjusted under 35 U.S.C. 154(b) by 0 days.

(21) Appl. No.: 17/735,766

(22) Filed: May 3, 2022

(65) Prior Publication Data

US 2022/0329284 A1 Oct. 13, 2022

Related U.S. Application Data

(63) Continuation of application No. PCT/IL2020/050905, filed on Aug. 17, 2020.

(51) Int. Cl.
 *H04B 3/32* (2006.01)
 *H04R 1/10* (2006.01)
 *H04R 3/00* (2006.01)

(52) U.S. Cl.
 CPC ............ *H04B 3/32* (2013.01); *H04R 1/1091* (2013.01); *H04R 3/00* (2013.01)

(58) Field of Classification Search
 CPC . H04B 3/32; H04B 3/34; H04B 3/487; H04R 1/1091; H04R 3/00; H04R 3/005; H04J 1/12; H04J 3/10; H04Q 2011/0049; H04Q 2201/14
 USPC ............ 381/83, 93, 1, 17, 26, 74; 455/575.2
 See application file for complete search history.

(56) References Cited

U.S. PATENT DOCUMENTS

| 2,943,272 | A | | 6/1960 | Feldman |
| 3,912,877 | A | | 10/1975 | Braun et al. |
| 4,118,600 | A | | 10/1978 | Stahl |
| 5,432,484 | A | * | 7/1995 | Kias ................... H01R 13/6469 333/5 |
| 6,507,620 | B1 | * | 1/2003 | Usui ....................... H04B 3/34 375/220 |

(Continued)

FOREIGN PATENT DOCUMENTS

| EP | 0446407 A2 | 9/1991 |
| WO | 2011051068 A1 | 5/2011 |

OTHER PUBLICATIONS

Philip Karantzalis, "Compensate for Wire Drop to a Remote Load", : LT Journal of Analog Innovation, pp. 29-30. (2014).

*Primary Examiner* — Xu Mei

(57) ABSTRACT

A method and circuit for providing adaptive suppression of signal crosstalk appearing on a common return wire in a signal cable connected to a device. The method steps comprise connecting an adjustable negative resistance circuit between the common wire terminal and a common point at the device; determining an auxiliary current (Iaux) such that is flowing through at least one of the cable wires and returns through the common wire; sensing the voltage between selected at least one of the cable wire terminals at the device port and the common point, while ensuring that this level is substantially affected by Iaux; measuring a level of the sensed voltage according to a predefined level measurement procedure; and adjusting the negative resistance so as to nullify said voltage level, thereby effectively cancelling the common wire ohmic resistance.

20 Claims, 4 Drawing Sheets

(56) References Cited

U.S. PATENT DOCUMENTS

| | | | |
|---|---|---|---|
| 6,975,734 B1 | 12/2005 | Suzuki | |
| 6,999,504 B1 * | 2/2006 | Amrany | H04L 5/20 |
| | | | 375/222 |
| 8,754,662 B1 | 6/2014 | Weng | |
| 10,045,124 B2 * | 8/2018 | Lesso | H04R 5/04 |
| 10,840,971 B2 * | 11/2020 | Spirkl | H04L 25/4917 |
| 2002/0118082 A1 | 8/2002 | Kawai | |
| 2009/0270039 A1 * | 10/2009 | Bouzidi | H04B 3/32 |
| | | | 455/63.1 |
| 2011/0096931 A1 | 4/2011 | Ormin | |

* cited by examiner

SIGNAL CROSSTALK SUPPRESSION ON A COMMON WIRE

FIELD OF THE INVENTION

The present invention relates generally to signal crosstalk suppression techniques, and more particularly to methods and circuits for suppressing crosstalk in signal cables.

BACKGROUND OF THE INVENTION

Crosstalk between signals may occur in a signal cable due to insufficient isolation between the different signal lines included in the cable. In a particular case of this phenomenon, which is dealt with in embodiments of the present invention, a crosstalk voltage appears on a common return wire in a cable that includes a plurality of signal carrying wires. This crosstalk voltage may cause interference to one or more receiving circuits connected to the cable.

One technique for mitigating the above problem in disclosed in U.S. Pat. No. 2,943,272. The disclosed technique comprises connecting a negative impedance circuit in series with the common wire on which the crosstalk appears. The negative impedance value is determined such that it compensates the common wire impedance as well as the average mutual impedance of the effective inductive coupling between the signal wires. However, this solution assumes that the common wire impedance is known when the system in which this solution is implemented is operational. Unfortunately, this assumption does not always hold. For example, achieving the common wire impedance in advance may be a complicated task, there may not be a free access to both cable ends simultaneously, the cable may be changed during the system operation etc.

Another crosstalk reduction technique comprising using negative impedance is provided in U.S. Pat. No. 3,912,877. In one embodiment, the effective negative impedance is implemented by a feedback circuit for shifting the signal voltage at the far end of the network in a direction opposing the phase of the voltage at the high impedance end of the network. Unfortunately, this solution does not seem applicable for reducing crosstalk voltage that appears on a common return wire.

U.S. Pat. No. 8,754,622 discloses various embodiments of a circuit that automatically compensates a voltage regulator output for voltage drop along the conductors connecting it to the load. This is done using virtual remote sensing technique in which the conductors' resistance is measured as the ratio between fast voltage variations induced at the regulator output and the resultant current variations. The output resistance of the regulator is then correspondingly compensated. Unfortunately, this solution either does not seem applicable for reducing crosstalk voltage that appears on a common return wire.

Thus, it would be desirable to provide an on-line method for suppressing crosstalk voltage that appears on a common return wire in a signal cable, wherein only the near end of the cable is accessible.

SUMMARY OF THE INVENTION

Accordingly, it is a principal object of the present invention to provide an adaptive on-line method for suppressing signal crosstalk that might appear on a common return wire in a signal cable. In a typical embodiment, two or more signal currents flow through two or more respective signal wires included in a cable that comprises a plurality of wires. The cable wires are terminated in a device side thereof at a device port, and the signal crosstalk voltage appears on a common wire within the cable through which the signal currents return to their respective origins. Signal origins may be located at the device as well as in other equipment coupled to the opposite cable end. This opposite cable end is called hereinafter "user side" thereof, however any suitable equipment may be coupled thereto.

Thus, in accordance with an embodiment of the present invention, the disclosed method of signal crosstalk suppression comprises the following steps:

(1) Connecting a negative resistance circuit having an adjustable output negative resistance (hereinafter denoted as "negative resistance") between the common wire terminal at the device port and a common point at the device to which the device port pertains.

(2) Determining an auxiliary current (Iaux) such that is flowing through at least one of the cable wires and returns through the series connection of the common wire and negative resistance circuit (hereinafter denoted as "series connection"). In various embodiments, there are various options and combinations thereof to determine Iaux. Iaux may comprise current flowing through one or more signal wires and/or non-signal cable wires such as wires carrying some control current or spare wires. Iaux may be chosen from the currents flowing anyway through the cable wires, whereas at least a part thereof may be purposely applied to carry out the disclosed signal crosstalk suppression techniques.

(3) Sensing the voltage between selected at least one of the cable wire terminals at the device port and the common point. The sensed voltage can be either positive or negative, which depends on whether the absolute value of the negative resistance is adjusted lower or higher than the common wire resistance respectively.

(4) Measuring a level of the sensed voltage according to a predefined level measurement procedure, wherein Iaux, said selected at least one of the cable wire terminals and said level measurement procedure are determined so as to ensure that said voltage level is substantially affected by the voltage drop of Iaux on the common wire resistance, i.e. on the series connection when the negative resistance value is set to zero.

(5) The last step is adjusting the negative resistance so as to nullify said voltage level, thereby effectively cancelling the common wire ohmic resistance.

Adjusting the negative resistance is performed in some embodiments by applying one of the following two adjustment modes, and optionally toggling therebetween:

feed-forward mode: starting by setting the negative resistance to zero, calculating Rc as the ratio between the sensed voltage level and Iaux level while determining Iaux level based on said predefined level measurement procedure, and adjusting the negative resistance to –Rc, and feedback mode: adjusting the negative resistance in a closed loop so as to nullify the voltage level.

In various embodiments, Iaux and the level measurement procedure are determined in one of the following ways:

(a) Iaux is a direct current (DC), and the level measurement procedure comprises near DC narrow spectrum filtering.

(b) Iaux has a given spectral shape, and the level measurement procedure comprises filtering adapted to said given spectral shape, (c) Iaux has a given modulation pattern, and the level measurement procedure comprises demodulation adapted to said given modulation pattern, and (d) Iaux has a spread spectrum waveform, and the level measurement procedure comprises correlation with a synchronized replica of the spread spectrum waveform spreading code.

(e) Iaux has a frequency hopping waveform, and the level measurement procedure comprises tracking with an appropriate tracking pattern.

In embodiments of the present invention, the signal crosstalk voltage may hinder the control operation at its initial stage. This may happen since the voltage level may not be substantially affected by the voltage drop of Iaux on Rc before Rc is actually cancelled. This problem may arise, e.g., where a signal generated at the equipment coupled to one cable end is fed back to the cable by the equipment coupled to its opposite end. In order to mitigate this problem, the disclosed method comprises in some embodiments the further step of attenuating at least part of the signal currents thereby improving the initial conditions of the negative resistance adjustment operation. A particular case of the above feedback is a side-tone generated at the device, which may even excite oscillations through the common wire. In this case, the above attenuation may be achieved by attenuating a side-tone path associated with the device port.

In some embodiments, improving the initial conditions of the negative resistance control is achieved, additionally or alternatively to the above signal attenuation, by further means. These means comprise starting the feedback mode with a predefined negative resistance initial value, typically such that may alleviate convergence of the feedback operation. An additional means may be intervening in the feedback operation by applying forced negative resistance adjustment upon detecting poor convergence of the feedback operation.

In some embodiments, the device port constitutes an audio port connected through the signal cable to an audio handset or headset, and the cable includes at least one microphone wire and at least one earphone or loudspeaker wire. Implementing the present invention in this case is especially beneficial if side-tone is implemented in the device, since then earphone-to-microphone crosstalk may excite oscillations. In some of these embodiments, when the device, hence the audio port, is operated in half-duplex mode, push-to-talk (PTT) current flowing through a PTT wire is used as Iaux. The microphone wire terminal at the audio port is then typically selected for measuring the voltage level on the series connection, near DC in this case, and adjusting accordingly the negative resistance as explained above.

When the device, hence the audio port, is operated in half-duplex mode, in some embodiments the feed-forward adjustment mode is applied in at least part of the start-of-talk instances. Feedback mode, if implemented, typically follows and the negative resistance value achieved at the end of the talk period is stored in some embodiments so as to be applied in the next start-of-talk instance.

In accordance with an embodiment of the present invention, there is also provided a signal crosstalk suppression circuit for adaptive suppression of signal crosstalk that may appear on a common return wire as described above. The crosstalk suppression circuit typically comprises:

(1) A negative resistance circuit connected, as described above, between the common wire terminal at the device port and the common point at the device, and configured to assume an adjustable output negative resistance.

(2) A control circuit configured to implement the aforementioned method steps.

BRIEF DESCRIPTION OF THE DRAWINGS

The present invention will be more fully understood from the following detailed description of the embodiments thereof, taken together with the drawings in which.

DETAILED DESCRIPTION OF EMBODIMENTS

Embodiments of the present invention provide adaptive on-line signal crosstalk suppression, wherein the signal crosstalk voltage to be suppressed appears on a common return wire in a signal cable. Such a cable typically comprises two or more signal wires carrying respective signal currents to or from a device port. The disclosed techniques allow carrying out the suppression by suppression circuitry residing in the device while accessing only the near end of the cable, i.e. the end terminated at said device port. Throughout the following description, the term "substantially" indicates that some small error is typically allowed, which depends on the implementation limitations and expected usage conditions in the embodiments wherein the disclosed techniques are implemented.

Figure 1:
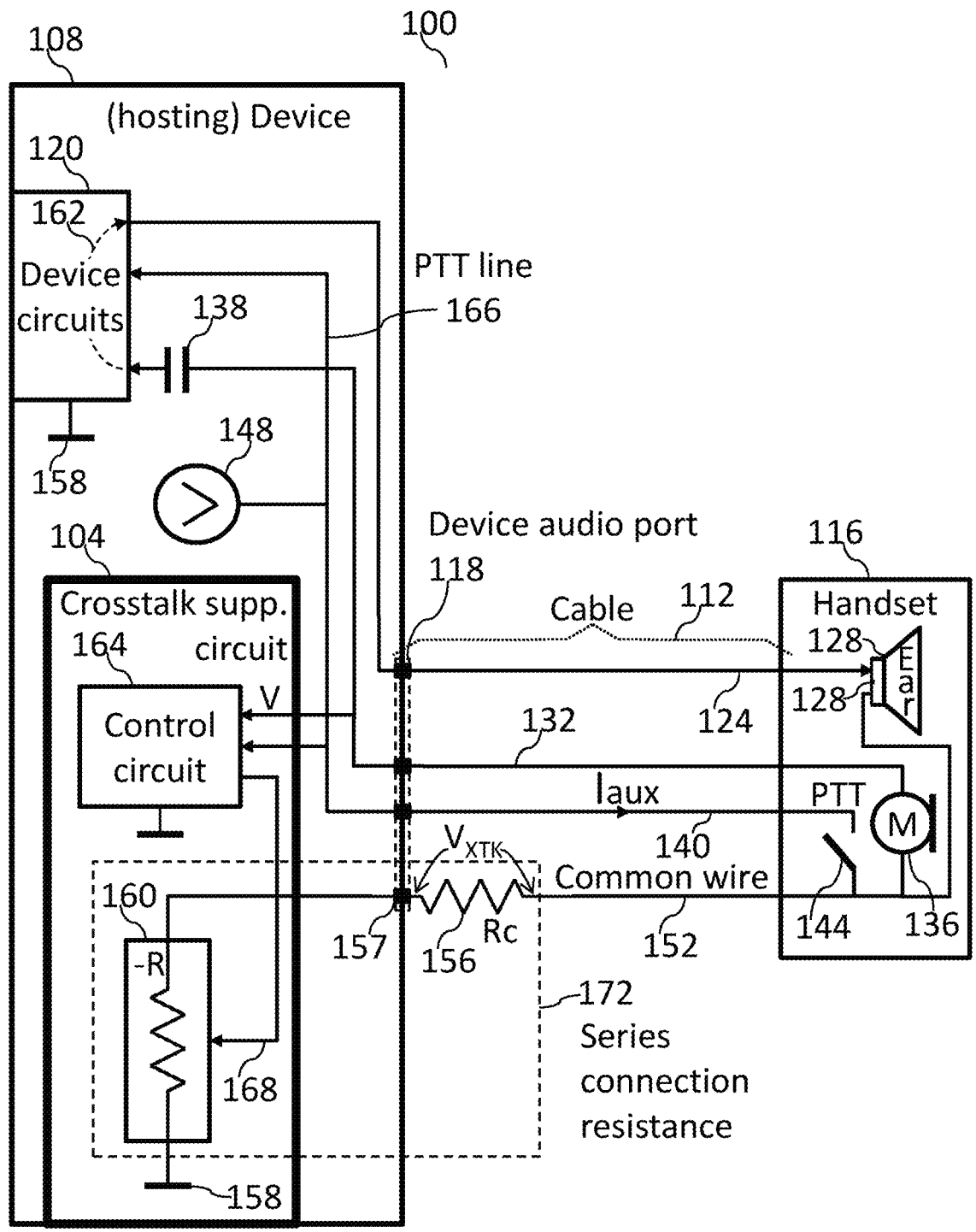
FIGS. 1 to 3 are block diagrams that schematically illustrate three respective system variations in which signal crosstalk suppression is realized, in accordance with respective embodiments of the present invention.

Referring to FIG. 1, there is shown a block diagram of an audio system 100 that includes a signal crosstalk suppression circuit 104, in accordance with an embodiment of the present invention. In the figure, a communication device 108, which contains the crosstalk suppression circuit 104, is connected through a signal cable 112 to a handset 116 at the user side thereof. Cable 112 is terminated in its device side at a device port 118, which is an audio port in the illustrated embodiment. Device port 118 typically comprises a socket connector into which a mating connector terminating the device side of cable 112 is plugged. The cable wires are coupled through device port 118 to crosstalk suppression circuit 104 and to the other device circuits represented by block 120.

Following are the wires included in cable 112: An earphone wire 124 connected to an earphone 128 in handset 116, a microphone wire 132 connected between a microphone 136 in handset 116 and a coupling capacitor 138, a push-to-talk (PTT) wire 140 connecting a PTT current source 148 to a PTT switch 144 in handset 116, and a common wire 152. Common wire 152 constitutes a return path for the earphone signal current, the microphone signal current and the PTT current, each back to its originating source. In devices that do not include crosstalk suppression circuit 104, common wire 152 is commonly directly connected, through a connection point 157 in device port 118, to a common point 158 of device 108 circuits. Common point 158 represents a ground point in typical devices. Common wire 152 has an ohmic resistance Rc 156 on which a crosstalk voltage $V_{XTK}$ may appear. $V_{XTK}$ is typically meaningful when cable 112 length exceeds a few meters, which results in an Rc value of several ohms. Earphone 128 current, flowing through Rc due to side-tone path 162, then results in a meaningful $V_{XTK}$ which constitutes a crosstalk interference added to the desired signal of microphone 136. If $V_{XTK}$ is not suppressed at the microphone input to device circuits 120, it might excite echo or even oscillations in the described positive feedback loop.

In device 108, common wire 152 is connected to common point 158 through a negative resistance circuit (NRC) 160, which is part of crosstalk suppression circuit 104. NRC 160 has an adjustable output resistance depicted as a negative resistance −R. A control circuit 164 within crosstalk suppression circuit 104 controls NRC 160 through a control line 168 such that −R would tend to −Rc. This would obviously cause the above crosstalk interference to tend to zero. For carrying out that control operation, control circuit 164 senses a voltage V on the microphone line input to device circuits 120. PTT switch 144 indicates that audio system 100 illustrated in FIG. 1 is operating in half-duplex mode. This means that microphone 136 is active only during talk periods when PTT switch 144 is closed. In typical embodiments, control circuit 164 processes V, as described in the following, only during such talk periods. Control circuit 164 and device circuits 120 are aware of the talk periods due to a PTT line 166 that is connected to both blocks.

The PTT current is denoted, in the context of the present invention, as Iaux, which stands for "auxiliary current". Iaux is a DC current of typically a few mA. Iaux and only Iaux produces the DC component of V. This is achieved due to the presence of coupling capacitor 138 on the microphone line, and assuming that the earphone drive circuit at device circuits 120 is DC balanced. Control circuit 164 senses V and then determines its level by passing it through a narrow low pass filter (LPF), not shown in FIG. 1, thereby detecting its DC component. This filtering serves to remove the mic and earphone signals from V. Consequently, the measured V level substantially consists of the voltage drop of Iaux on the series connection of Rc and −R, denoted as resistance 172. Control circuit 164 attempts to nullify V through control line 168, which would actually adjust −R to compensate Rc thereby cancel its effect of producing signal crosstalk. In other words, the signal currents drop on −R would compensate $V_{XTK}$ thereby suppressing the crosstalk interference going to the microphone circuits within device circuits 120. The operation of control circuit 164 is further explained with reference to FIG. 4 hereinafter.

The PTT voltage at the output of current source 148 indicates to device circuits 120 the talk/listen status of handset 116, based on the state of PTT switch 144. In some embodiments, current source 148 is implemented by a resistor connected to some Vcc voltage. In other embodiments, an active circuit is employed for generating Iaux. In typical embodiments, crosstalk suppression circuit 104 makes use of current source 148, which is an integral component of device 108 audio circuits, as the only Iaux source. However, in some embodiments another current source may be employed, additively or alternatively, to generate Iaux. In some embodiments, cable 112 is connected to other user equipment than handset 128. Such equipment may include a headset, a loudspeaker instead of earphone 128 and more. In other embodiments, at least one other cable wire, which is not carrying either a signal or PTT current, can be employed for conducting Iaux therethrough.

Figure 2:
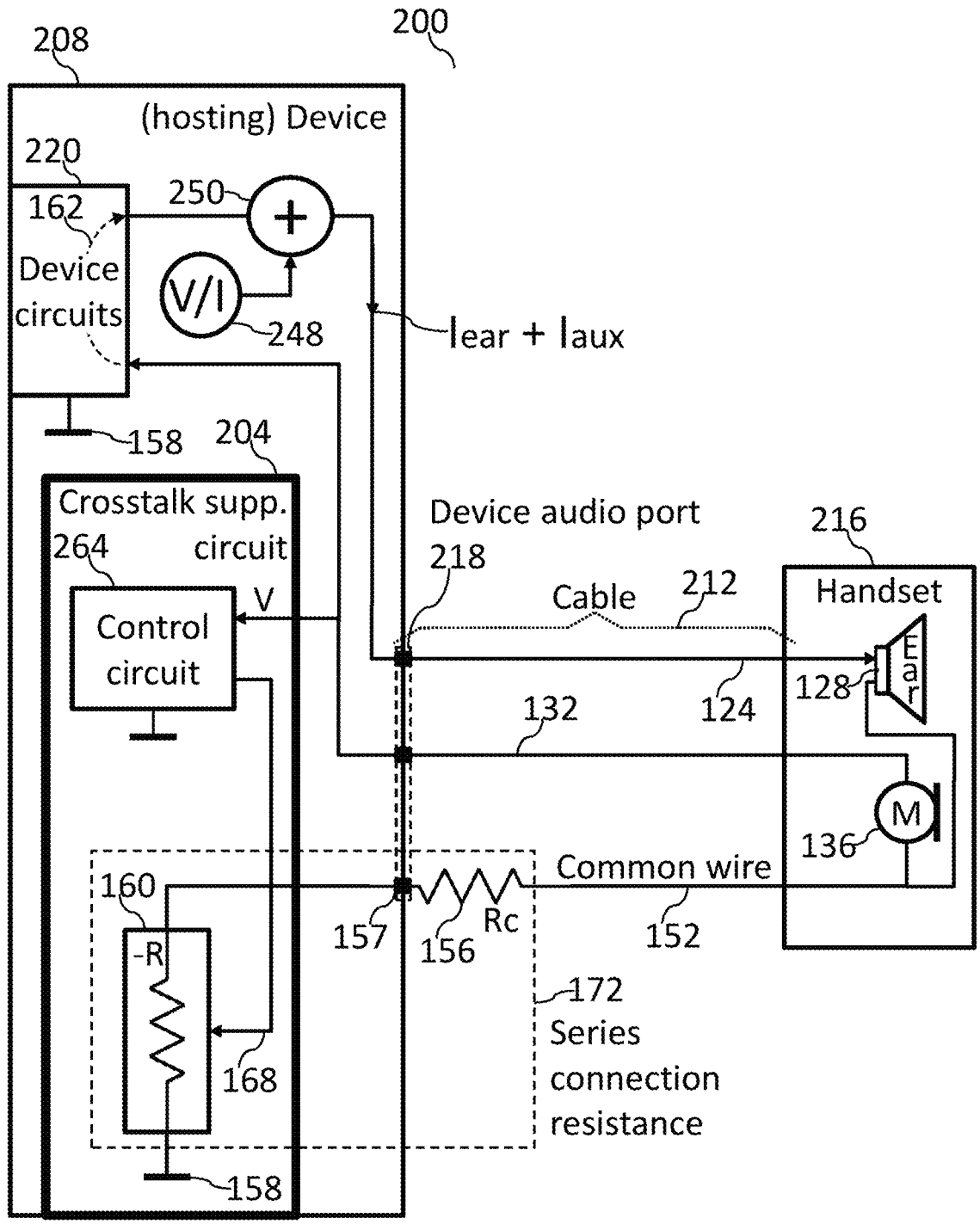

Referring now to FIG. 2, there is shown a block diagram of an audio system 200 that includes a crosstalk suppression circuit 204, in accordance with an embodiment of the present invention. System 200 mainly differs from system 100 in that the circuits of device 208, indicated by reference numeral 220, operate in full-duplex mode, i.e. the user of handset 216 can simultaneously talk and hear his peer user. Oscillations may be excited in this case also through a positive feedback loop that includes the common wire resistances of two peer systems like system 200. There is no PTT mechanism in system 200. Consequently, a dedicated either voltage or current auxiliary generator 248 is purposely employed for conducting Iaux through earphone wire 124, thereby through common wire 152. A combining circuit 250 sums the audio signal going to earphone 216 through device port 218 with the output signal of V/I 248. Consequently, Iear+Iaux are flowing through earphone wire 124. The exact function of combining circuit 250 is adapted to the V/I 248 type, i.e. it is either a voltage combiner or a current combiner.

In a preferred embodiment, Iaux is an AC tone, preferably out of the effective band of earphone 128, and having sufficiently low amplitude in order not to disturb the user of system 200. Analogously to system 100 operation, control circuit 264 senses voltage V on the microphone line input to device circuits 220. Control circuit 264 then measures the level of V by passing it through a narrow band pass filter (BPF), not shown in FIG. 2, which is centered on Iaux tone frequency. In typical embodiments, the BPF width is chosen sufficiently narrow so as to minimize the error caused by the audio signals that normally flow through resistance 172. However, the BPF width is typically chosen wider than 1 Hz so as to achieve sufficiently fast measurement of V.

Figure 3:
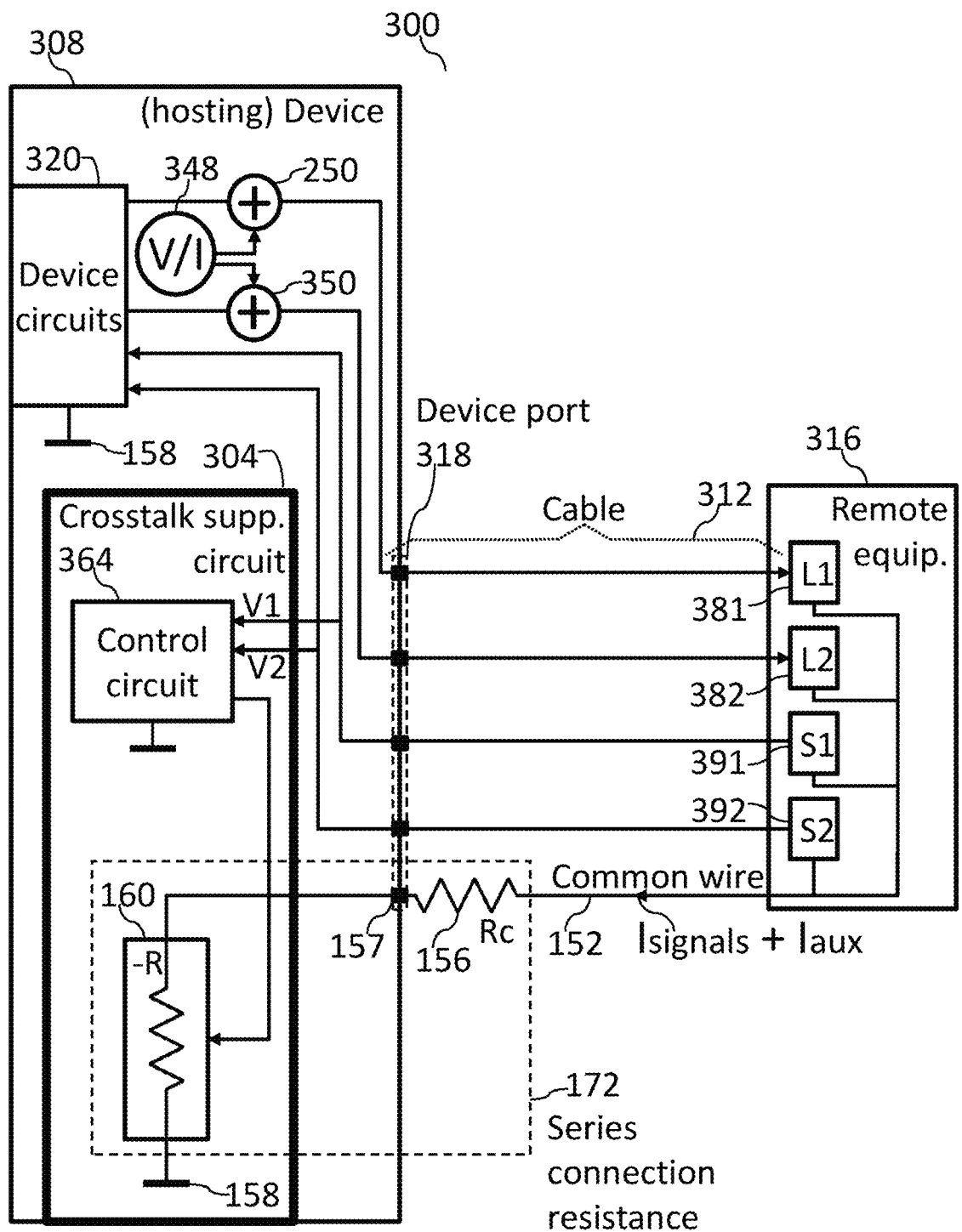

FIG. 3 illustrates a block diagram of a system 300 that includes a crosstalk suppression circuit 304, in accordance with an embodiment of the present invention. System 300 constitutes some generalization of systems 100 and 200. A cable 312 connects a device port 318 of a device 308 to a remote equipment 316. Remote equipment 316 includes loads 381 and 382 and signal sources 391 and 392. The involved signals may be of various types such as analog and/or digital, baseband and/or modulated and having narrow and/or wide spectrum. Signal currents generated and received by device circuits 320 return to their respective origins through common wire 152 together with Iaux. Iaux results due to an auxiliary generator 348, which adds either voltage or current, depending on the specific embodiment, to each of combiners 250 and 350. This way Iaux is distributedly generated which allows reduced interference of Iaux with the signal currents flowing to loads 381 and 382. Control circuit 364 senses the voltage drop resulting from Iaux flow through resistance 172. For this sake, control circuit 364 senses the manifestation of this voltage drop through S1 and S2 line terminations at device port 318 denoted as V1 and V2 respectively. Using both V1 and V2 for measuring the level of Iaux voltage drop on resistance 172 allows for reducing the measurement error by employing noise reduction methods known in the art.

In embodiments of the present invention, NRC 160 output stage, which reflects negative resistance −R, is implemented by various means such as a low offset operational amplifier or a switched circuit. A digital, analog or mix thereof feedback loop takes care of imparting the output stage with the desired negative resistance value. Control circuits 164, 264 and 364 typically comprise a general-purpose controller, and filtering the sensed voltage is implemented by digital and/or analog circuits. The above description has focused on the specific system elements that are essential for understanding certain features of the disclosed techniques. Conventional elements that are not needed for this understanding such as RFI/EMI filters, and the internal structure of some operational blocks, have been omitted from FIGS. 1 to 3 for the sake of simplicity, but will be apparent to persons of ordinary skill in the art. The configurations shown in FIGS. 1 to 3 are example configurations, which were chosen purely for the sake of conceptual clarity. In alternative embodiments, other suitable configurations can also be used.

Figure 4:
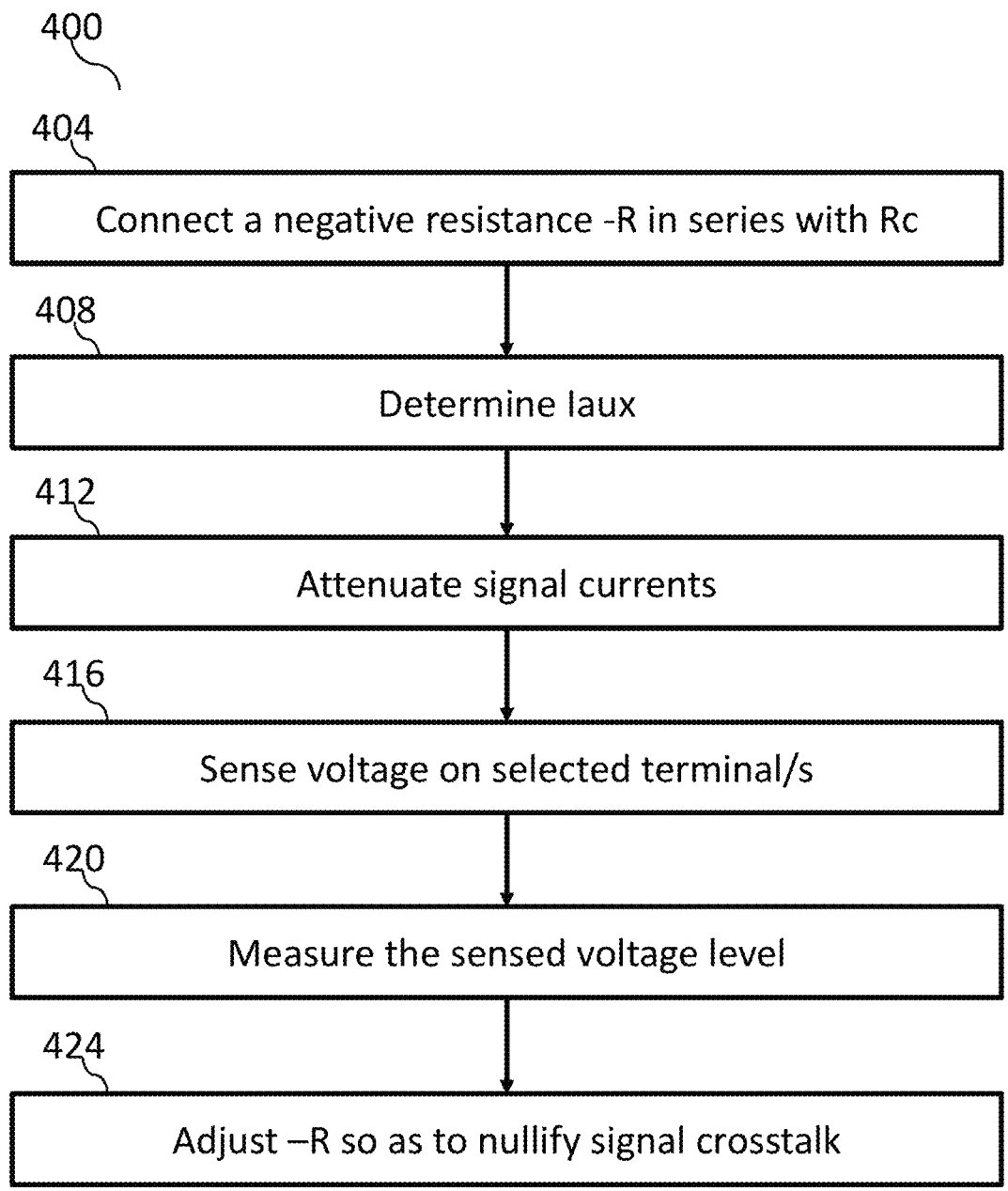
FIG. 4 is a flowchart that schematically illustrates a method of signal crosstalk suppression, in accordance with an embodiment of the present invention.

Referring now to FIG. 4, there is shown a flowchart 400 that schematically illustrates a method of crosstalk suppression, in accordance with an embodiment of the present invention. For the sake of simplicity, the method steps are explained mainly with reference to system 100 in FIG. 1, and their relation to other embodiments, such as systems 200 and 300, should be apparent from the explanation. Flowchart 400 begins with a connecting step 404, which comprises connecting negative resistance circuit (NRC) 160 between common wire terminal 157 and common point 158 thereby creating resistance 172 made of the series connection of Rc and −R. Next in a determination step 408, Iaux properties and path are determined. Iaux going path (from device 108) may include one or more signal wires and/or one or more non-signal wires. Iaux return path comprises common wire 152. Iaux preferred amplitude, waveform and spectral properties depend on the overall system properties. Iaux may be chosen from the currents flowing anyway through the wires included in cable 112, whereas at least part thereof may be purposely applied. An attenuating step 412 that follows refers to optional attenuating signal currents that may interfere with control circuit 164 operation. This attenuation is typically done for short times that should not meaningfully impact the normal system operation. A typical example of this attenuation is side-tone path attenuation or even inhibition at start-of-talk times.

Flowchart 400 proceeds to a sensing step 416, in which control circuit 164 senses the voltage on selected one or more wire terminals at device port 118 (may be also 218 or 318) relative to common point 158. Next, in a measurement step 420, control circuit 164 measures a level of the sensed voltage, as already explained with reference to FIGS. 1, 2 and 3. The voltage level is measured in various embodiment by various measurement means such as passive circuitry, digital circuitry or a combination thereof. The voltage level is measured according to a predefined level measurement procedure. Iaux determination, the criterion for selecting the sensed terminals and the level measurement procedure are related to each other. These three system characteristics are determined, in the design stage of any embodiment of the disclosed techniques, so as to ensure that the measured level of the sensed voltage would be substantially affected by the voltage drop of Iaux on the common wire resistance Rc, i.e. on the series connection resistance 172 when the negative resistance value is set to zero. To achieve this goal, the level measurement procedure is determined with relation to Iaux characteristics. Following are some examples of this relation; however, other relations can be employed in embodiment of the present invention:
  (a) Iaux is a direct current (DC), and the level is determined after narrow spectrum filtering near DC. This is the option implemented in system 100.
  (b) Iaux has a given spectral shape, and the level is determined after filtering adapted to Iaux spectral shape. System 200 is a particular case of this option.
  (c) Iaux has a given modulation pattern, and the level is determined after demodulation adapted to Iaux modulation pattern.
  (d) Iaux has a spread spectrum waveform, and the level is determined based on correlation with a synchronized replica of the Iaux spreading code. This option may relate to system 300.
  (e) Iaux has a frequency hopping waveform, and the level is determined by tracking the sensed voltage with a tracking pattern adapted to Iaux hopping.

Flowchart 400 ends with an adjustment step 424, in which control circuit 164 controls NRC 160 so as to nullify the voltage level measured in step 420. This nullifying is achieved by adjusting −R to effectively cancel Rc thereby to compensate the crosstalk voltage $V_{XTK}$. This is done by employing one of the following adjustment modes or a combination thereof:
  feed-forward mode: comprises the steps of determining Iaux level based on said predefined level measurement procedure; setting the negative resistance to zero; calculating Rc as the ratio between the sensed voltage level and Iaux level;
  and adjusting the negative resistance to −Rc, and feedback mode: adjusting the negative resistance in a closed loop so as to nullify the voltage level.

In various embodiments, control circuit 164 applies the above two control modes in appropriate times and periods, depending on the specific system architecture and operation regime. For example, feed-forward mode can be applied at start of system operation, at start of a talk period in half-duplex mode, when cable change is detected and when some inactivity period is detected. Feedback mode is typically applied immediately after feed-forward cycle termination; however, it can be also applied at start of system operation and at start of talk periods. In the latter case, control circuit 164 typically stores the last −R value attained during talk period and starts the next feedback operation with the stored −R value. In some embodiments, control circuit 164 applies feedback mode at start of system operation while employing some predefined −R initial value, e.g. −Rcmin, which is the minimum Rc value that is not likely to significantly affect the system operation. Control circuit 164 typically checks whether the feedback closed loop converges sufficiently fast. If it does not, control circuit 164 would force a new −R value so as to alleviate convergence. In some embodiments, some variations of the above adjustment modes or different modes may also be employed as part of the disclosed techniques.

It should be noted that nullifying V is practically prone to some implementation errors, therefore perfect Rc compensation and crosstalk suppression cannot be actually reached. Such errors can typically result due to component offsets. Another error factor is V measurement through a filter adapted to the employed Iaux. This filter is typically chosen sufficiently wide so as to shorten the measurement time which determines the feed-forward duration. However a wide filter may cause the signal crosstalk voltage as well as some signal sources, e.g. microphone 136, to affect the measured V.

Flowchart 200 is an example flowchart, which was chosen purely for the sake of conceptual clarity. In alternative embodiments, other suitable flowcharts can also be used for illustrating the disclosed method. Method steps that are not mandatory for understanding the disclosed techniques were omitted from FIG. 4 for the sake of simplicity.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method of suppressing signal crosstalk, wherein two or more signal currents flow through two or more respective signal wires included in a cable, each signal wire of the cable is terminated at one end thereof at a device port of a device, and a signal crosstalk voltage appears on a common wire within the cable through which signal currents return back to their respective origins, the method comprising the following steps:

connecting a negative resistance circuit having an adjustable output negative resistance, hereinafter denoted as "negative resistance" between a terminal of the common wire at the device port and a common point at the device to which the device port pertains;

determining an auxiliary current (Iaux) such that is flowing through at least one of the signal wires and returns through the series connection of the common wire and said negative resistance circuit, hereinafter denoted as "series connection";

sensing the voltage between selected at least one of the terminals of the signal wires at the device port and the common point;

measuring a level of the sensed voltage according to a predefined level measurement procedure, wherein Iaux, said selected at least one of terminals of the cable wire and said predefined level measurement procedure are determined so as to ensure that voltage level is substantially affected by the voltage drop of Iaux on resistance of the common wire, i.e. on a series connection when the negative resistance value is set to zero; and adjusting the negative resistance so as to nullify said voltage level, thereby effectively cancelling the common wire ohmic resistance.

2. The method of claim 1, wherein adjusting the negative resistance, so as to nullify said level of the sensed voltage, is performed in at least one of the following modes:

feed-forward mode: comprises the steps of determining Iaux level based on said predefined level measurement procedure; setting the negative resistance to zero; calculating the resistance of the common wire Rc as the ratio between the sensed voltage level and Iaux level; and adjusting the negative resistance to −Rc, and feedback mode: adjusting the negative resistance in a closed loop so as to nullify the voltage level.

3. The method of claim 1, wherein Iaux and the predefined level measurement procedure are determined in one of the following ways:

(a) Iaux is a direct current (DC), and the predefined level measurement procedure comprises near DC narrow spectrum filtering, (b) Iaux has a given spectral shape, and the predefined level measurement procedure comprises filtering adapted to said given spectral shape, (c) Iaux has a given modulation pattern, and the predefined level measurement procedure comprises demodulation adapted to said given modulation pattern (d) Iaux has a spread spectrum waveform comprising a given spreading code, and the predefined level measurement procedure comprises correlation with a synchronized replica of said given spreading code, and (e) Iaux has a frequency hopping waveform comprising a given hoping pattern, and the predefined level measurement procedure comprises tracking with said given hoping pattern.

4. The method of claim 1, further comprising the step of attenuating at least part of the signal currents so as to improve the initial conditions of the negative resistance adjustment operation.

5. The method of claim 4, wherein attenuating at least part of the signal currents is achieved by attenuating a side-tone path associated with the device port.

6. A signal crosstalk suppression circuit associated with a device, wherein a plurality of wires contained in a cable are terminated at a port of the device in one cable end, two or more of the plurality of wires are signal wires carrying respective two or more signal currents, a signal crosstalk voltage appears on a common wire within the cable through which the signal currents return back to their respective origins, and an auxiliary current (Iaux) is determined such that it is flowing through at least one of the signal wires and returns through a series connection of the common wire hereinafter denoted as "series connection" forming a circuitry that comprises:

a negative resistance circuit connected between a common wire terminal at the device port and a common point at the device and configured to assume an adjustable output negative resistance hereinafter denoted as "negative resistance"; and a control circuit configured to perform the steps of:

sensing means for sensing voltage between selected at least one of the signal wire terminals at the device port and the common point and determining a level of the sensed voltage according to a predefined level measurement procedure; and adjustment means for adjusting the negative resistance so as to nullify said voltage level, thereby effectively cancelling ohmic resistance of the common wire, wherein Iaux, said selected at least one of the terminals of the cable wire and said level measurement procedure are determined so as to ensure that said voltage level is substantially affected by the voltage drop of Iaux, i.e., on a series connection when the negative resistance value is set to zero.

7. The circuit of claim 6, wherein adjusting the negative resistance so as to nullify said voltage level is performed in at least one of the following modes:

feed-forward mode: comprises the steps of determining Iaux level based on said predefined level measurement procedure; setting the negative resistance to zero; calculating resistance of the common wire Rc as the ratio between the sensed voltage level and Iaux level; and adjusting the negative resistance to −Rc, and feedback mode: adjusting the negative resistance in a closed loop so as to nullify the voltage level.

8. The circuit of claim 6, wherein Iaux and the predefined level measurement procedure are determined in one of the following ways:

(a) Iaux is a direct current (DC), and the predefined level measurement procedure comprises near DC narrow spectrum filtering, (b) Iaux has a given spectral shape, and the predefined level measurement procedure comprises filtering adapted to said given spectral shape, (c) Iaux has a given modulation pattern, and the predefined level measurement procedure comprises demodulation adapted to said given modulation pattern (d) Iaux has a spread spectrum waveform comprising a given spreading code, and the predefined level measurement procedure comprises correlation with a synchronized replica of said given spreading code, and (e) Iaux has a frequency hopping waveform comprising a given hoping pattern, and the predefined level measurement procedure comprises tracking with said given hoping pattern.

9. The circuit of claim 6, wherein the control circuit is further configured to perform the step of attenuating at least part of the signal currents so as to improve the initial conditions of the negative resistance adjustment operation.

10. The circuit of claim 9, wherein attenuating at least part of the signal currents is achieved by attenuating a side-tone path associated with the device port.

11. The circuit of claim 6, wherein Iaux is further determined to comprise current flowing through one or more cable wires not carrying signal currents.

12. The circuit of claim 6, wherein Iaux is further determined to comprise current flowing through one or more signal wires.

13. The circuit of claim 6, wherein at least part of Iaux is purposely applied to carry out the signal crosstalk suppression.

14. The circuit of claim 7, wherein adjusting the negative resistance in the feedback mode comprises starting with a predefined initial negative resistance value.

15. The circuit of claim 7, wherein adjusting the negative resistance in the feedback mode comprises applying forced negative resistance adjustment upon detecting poor convergence of the feedback operation.

16. The circuit of claim 7, wherein the device port constitutes an audio port and the signal wires include a microphone wire and an earphone or loudspeaker wire.

17. The circuit of claim 16, wherein Iaux comprises push-to-talk (PTT) current flowing through a PTT wire.

18. The circuit of claim 17, wherein the selected at least one terminal of the wires of the cable is the microphone wire terminal.

19. The circuit of claim 16, wherein the device operates in a half-duplex mode, and the control circuit is configured to apply the feed-forward mode in at least part of the start-of-talk instances.

20. The circuit of claim 16, wherein the device operates in a half-duplex mode, and the control circuit is configured to apply the feedback mode in at least part of the start-of-talk instances based on the negative resistance value attained in the previous talk period.

* * * * *